United States Patent

[11] 3,544,042

| [72] | Inventors | Jean Soulez-Lariviere<br>La Celle-St-Cloud;<br>Octave Lecocq, Boissy L'Aillerie, France |
|------|-----------|---|
| [21] | Appl. No. | 731,448 |
| [22] | Filed | May 23, 1968 |
| [45] | Patented | Dec. 1, 1970 |
| [73] | Assignee | Nord-Aviation Societe Nationale De<br>Constructions Aeronautiques<br>Paris, France<br>a joint-stock company of France |
| [32] | Priority | May 25, 1967 |
| [33] | | France |
| [31] | | No. 107904 |

[54] AERODYNE WITH VERTICAL TAKE-OFF OR LANDING MEANS
5 Claims, 3 Drawing Figs.

| [52] | U.S. Cl. | 244/56, 244/12 |
|------|----------|---|
| [51] | Int. Cl. | B64d 27/02 |
| [50] | Field of Search | 244/53, 55, 56, 12, 15, 23, 6, 7 |

[56] References Cited
UNITED STATES PATENTS

| 1,801,833 | 4/1931 | Allen | 244/12 |
|---|---|---|---|
| 2,762,584 | 9/1956 | Price | 244/12 |
| 2,780,424 | 2/1957 | Price | 244/12 |
| 2,974,900 | 3/1961 | Morris et al. | 244/12 |
| 3,033,490 | 5/1962 | Brown et al. | 244/12 |
| 3,284,027 | 11/1966 | Mesniere | 244/12 |
| 3,360,217 | 12/1967 | Trotter | 244/12 |

Primary Examiner—Milton Buchler
Assistant Examiner—James E. Pittenger
Attorney—Karl W. Flocks ABSTRACT: A vertical takeoff aerodyne in which symmetrical propellers on opposite sides of the aerodyne tilt about an inclined axis having an angle of inclination of about 30° relative to the transverse axis passing through the thrust centers of both propellers, with the horizontal stabilizer lying forwardly of the center of gravity G thereby preventing interactions of the various tilting positions of the propellers from causing instability of the aerodyne.

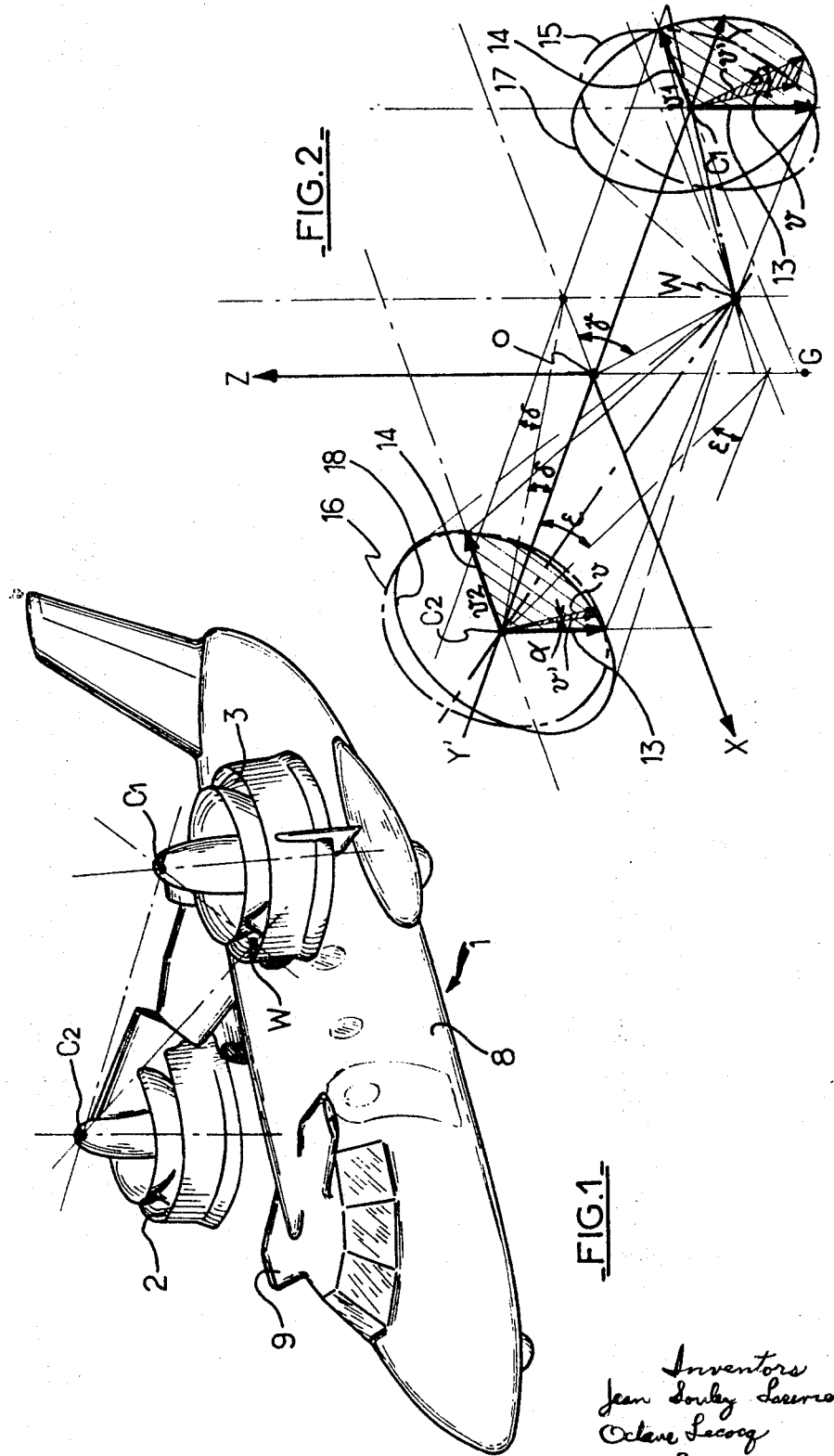

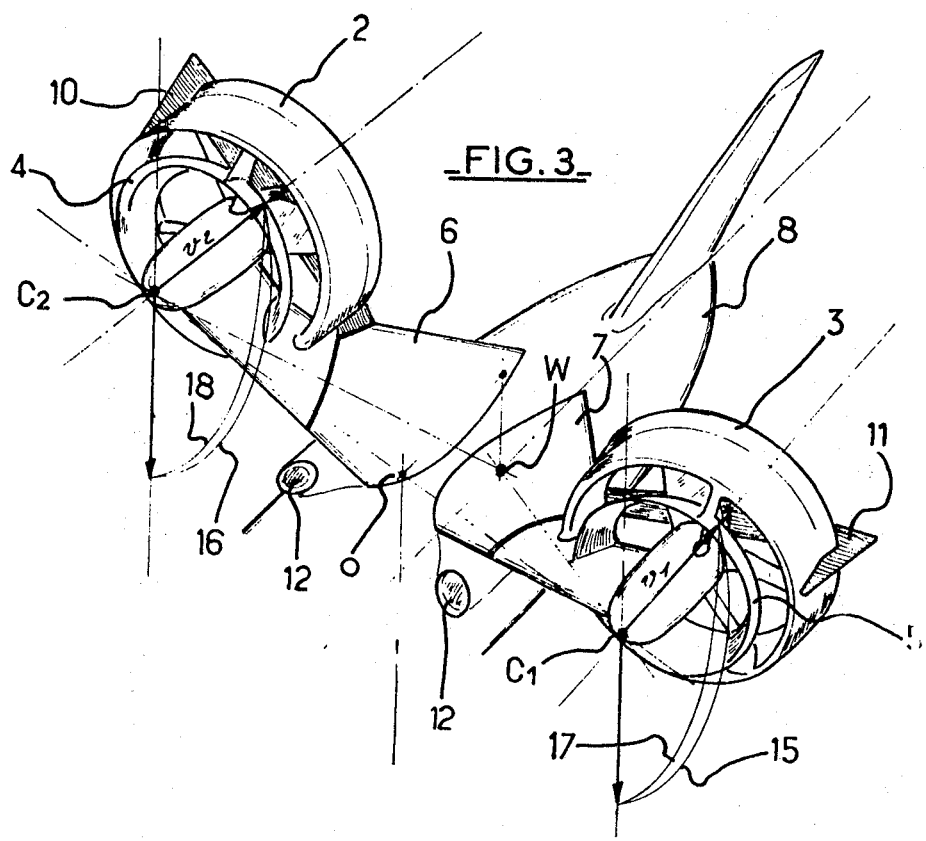

AERODYNE WITH VERTICAL TAKE-OFF OR LANDING MEANS

The present invention relates to an aerodyne with vertical takeoff or landing means, in particular of the type with two tilting propulsive units.

Such types of aerodynes, so-called ADAV, are described in U.S. Pat. No. 3,284,027. They must in particular fulfill the two following requirements:

the height for the protection of the propulsive units must, in the takeoff and landing positions, be sufficient to minimize the disturbances of the ground.

the disengagement of the horizontal stabilizers in the jet of the propulsive unit must be ensured, in order to eliminate the harmful interactions on the static stability of the different tilting positions of the rotors.

Thus, the fact of meeting these two requirements implies as is moreover clearly seen from the embodiment indicated in FIGS. 11 and 14 of the above-mentioned patent that the propulsive units be fixed on a raised spread of wings and that they be sufficiently removed from the fuselage of the aerodyne.

Further, the additional condition according to which the tilting axes of the propulsive units must be found on the extension one of the other and the consecutive fact of disposing the propulsive unit of the streamlined propellers in the wingspread, notably complicates the shape of the superstructures.

The present invention consequently provides an improvement in aerodynes of the ADAV type with two tilting propulsive units, improvement which aims at a special angular wedging of the two tilting axes of the propulsive units, the said wedging being such that the converging point of said two tilting axes is below and behind the axis joining the two thrust centres, the thrust axis of each propulsive unit passing through the two necessary end characteristic positions in planes parallel or perpendicular to the longitudinal axis of the aerodyne.

Other characteristics and advantages will become apparent from the following description, when read in conjunction with the accompanying drawings, illustrating diagrammatically and merely by way of example, an embodiment of the invention.

In the said drawings:

FIG. 1 is a perspective view of an aerodyne with two propulsive units according to the invention.

FIG. 2 is an explanatory diagram.

FIG. 3 is another perspective view of the aerodyne of FIG. 1 showing more particularly the characteristic wedging of the tilting axes of the propellers.

Considering a type of aerodyne of the prior art in which the tilting of the propulsive units is carried out about two merged axes, one can, by referring to FIG. 2, compare this conventional solution with the one of the invention.

The reference axes of FIG. 2, O–X, O–Y and O–Z are chosen in such a way that the axis Y–Y' passes through the two thrust centres $C_1$ and $C_2$, and that the centre of gravity G of the aerodyne is on the axis O–Z.

If one represents by $v1$ and $v2$ the thrust vectors corresponding to the thrust centres $C_1$ and $C_2$ of two propulsive units of the prior art tilting about a common axis Y–Y', these vectors pass during vertical takeoff and taking up horizontal flight from the position 13 to the position 14. The end of the corresponding vector describes the ideal circles 15 and 16 in planes parallel to the symmetry plane X–Y–Z of the aerodyne.

On the contrary, according to the invention, the tilting axes of the propulsive units exerting the thrusts $v1$ and $v2$ pass through a point W situated in the symmetry plane of the aerodyne, behind the centre of gravity G and below the axis Y–Y', point characterized by its angular parametres $\gamma$, $\delta$, and $\frac{1}{3}$.

When the propulsive units swing around their respective axes passing through W, the corresponding thrust vectors describe circles 17 and 18 symmetrically inclined on the symmetry axis of the plane. On these circles are necessary found two characteristic directions in a horizontal plane and a vertical plane corresponding to the vectors 13 and 14.

One sees that by describing these circles 17 and 18 the new thrust vectors $v'$ according to the invention are inclined relative to the corresponding vectors $v$ of the prior art on the circles 15 and 16 by a certain variable angle $\alpha$, but this symmetrical separation on either side of the aerodyne remains however fairly small, the horizontal composing forces of the one are compensated in the contrary direction by the horizontal composing forces of the one are compensated in the contrary direction by the horizontal composing forces of the other and its results on the piloting of the aerodyne are negligible if the inclination of the tilting axes is not exaggerated (up to approximately 30°).

Thus, the fact of being able to direct in such a way the tilting axes of the propulsive units will permit, as will become apparent hereafter from the description of a preferred embodiment of the invention, of simplifying the superstructures necessary for the attachment of the propulsive units.

It is obvious that the inclination on the axes O–X, O–Y and O–Z of the tilting axes W–$C_1$ and W–$C_2$ must be defined as a function of the characteristics proper to each type of aerodyne under consideration.

According to an embodiment of the invention shown in FIGS. 1 and 3, the ADAV aerodyne, illustrated as a whole by the reference 1, comprises two tilting propulsive units constituted by streamlined propellers 2 and 3 advantageously provided with auxiliary propellers 4 and 5 as described in applicant's U.S. application Ser. No. 731,449 filed May 23, 1968, now U.S. Pat. No. 3,519,367. In this aerodyne, the wedging parameters of the tilting axes of the propulsive units which are $\gamma = 45°$, $\epsilon = 30°$ and $\delta = 60°$ (see FIG. 1), have thus been chosen so as sufficiently to move back the aerodynamic centre from the suspended part, including the wingspread elements 6 and 7 and the fuselage 8. In these conditions, instead of a horizontal plane of a conventional wingtip placed in the rear in the wash of the propulsive units, on the contrary one disposes the horizontal plane in front of the fuselage 8 as is seen in FIG. 1.

Such an aerodyne is piloted as described in the above mentioned patent and the jet guiding elements 10 and 11 ensure to this end the suitable tilting of the propulsive units. Similarly in this aerodyne, the driving unit which drives the propellers may be disposed in the fuselage adjoining the point W, the transmission axes being then merged with the tilting axes, and the air inlets 12 may be disposed in the zone which joins the wingspread to the fuselage in order to reduce to a maximum the drag in speed flying.

Thus in this way, it is seen that the height for the protection of the propulsive units above the ground has been increased to a maximum to reduce the ground effects, that the horizontal stabilizers are no longer in the jet of the propulsive units, that the superstructures necessary for the attachment of the propulsive units have been eliminated and finally that the propulsive unit is now inside the fuselage.

It is obvious that the present invention has been heredescribed only as an explanatory but by no means limitative example of a special wedging of the tilting axes of an ADAV aerodyne with two propulsive units, and that changes in detail may be made therein, in conformity with its spirit, without coming out of its scope.

We claim:

1. A vertical takeoff aerodyne comprising:

the body of the aerodyne having upwardly extending dihedral wings therefrom;

a propulsive unit pivotally attached to each of at least two said wings; and pivotal means connected at an angle with the thrust axis of each of a pair of said propulsive units symmetrically located on wings on opposite sides of the body of the aerodyne from each other, each of said propulsive units connected to its said pivotal means at an angle alining said propulsive units substantially parallel to each other when said propulsive units are in vertical and horizontal positions and to tilt in positions between their vertical and horizontal positions having their rotational axes pass through a common point in the plane of symmetry of the body of the aerodyne offset from a transverse axis connecting the centers of rotation of the thrust axes of said propulsive units when said propulsive units rotate between their vertical and horizontal positions.

2. The vertical takeoff aerodyne of claim 1, further characterized by said common point being offset below and behind said transverse axis connecting said centers of rotation of the thrust axes.

3. The vertical takeoff aerodyne of claim 2 further characterized by said common point having its position determined by three angular position parameters relative to orthogonal axes constructed about said transverse axis of a longitudinal axis and an axis passing through the center of gravity of the aerodyne, the values of these parameters being respectively 45° measured in the longitudinal vertical plane, 30° measured in the transverse vertical plane, and 30° measured in the horizontal plane.

4. In a propulsive unit for a vertical takeoff aerodyne having dihedral wings, said propulsive unit attached to a wing, means freely pivoting thereon so that the tilting rotation axis of said unit passes through an extreme forward point of said freely pivoting unit thereby hinging said unit for the largest angular dihedral of the wing and pendular height above the center of gravity, said propulsive unit when in a vertical position having its thrust axis positioned at an angle with the rotational axis equal to the angle of said thrust axis with said rotational axis when said propulsive unit is in a horizontal position.

5. The apparatus of claim 4 wherein the thrust axis of said propulsive unit moves during the takeoff and landing maneuvers of the aerodyne between a substantially vertical position and a substantially horizontal position and has an inclination from the vertical plane of an angle having values between 0° and 30° during the movement of said propulsive unit between vertical and horizontal positions.